(12) United States Patent
Tsui

(10) Patent No.: US 8,769,414 B2
(45) Date of Patent: Jul. 1, 2014

(54) METHOD AND APPARATUS FOR REMINDING AND BROWSING RELATED INFORMATION OF CONTACTS AND RECORDING MEDIUM USING THE SAME

(75) Inventor: Yuan-Mao Tsui, Taoyuan County (TW)

(73) Assignee: HTC Corporation, Taoyuan County (TW)

( * ) Notice: Subject to any disclaimer, the term of this patent is extended or adjusted under 35 U.S.C. 154(b) by 33 days.

(21) Appl. No.: 13/211,289

(22) Filed: Aug. 16, 2011

(65) Prior Publication Data

US 2011/0302500 A1 Dec. 8, 2011

Related U.S. Application Data

(63) Continuation of application No. 12/703,790, filed on Feb. 11, 2010.

(30) Foreign Application Priority Data

Feb. 13, 2009 (TW) ................................ 98104649 A

(51) Int. Cl.
*G06F 3/00* (2006.01)

(52) U.S. Cl.
USPC ......................................................... 715/739

(58) Field of Classification Search
USPC ......... 715/739, 751, 752, 764, 810, 821, 840, 715/854; 709/206, 223
See application file for complete search history.

(56) References Cited

U.S. PATENT DOCUMENTS

| | | | | |
|---|---|---|---|---|
| 6,791,583 B2 * | 9/2004 | Tang et al. | ...................... | 715/751 |
| 7,814,438 B2 * | 10/2010 | Grossman et al. | ............. | 715/854 |
| 2007/0198677 A1 * | 8/2007 | Ozhan et al. | ................... | 709/223 |
| 2007/0240081 A1 | 10/2007 | Grossman et al. | | |
| 2008/0162504 A1 * | 7/2008 | Rentto et al. | ................... | 707/100 |

FOREIGN PATENT DOCUMENTS

| | | |
|---|---|---|
| CN | 101087462 A | 12/2007 |
| CN | 101188827 A | 5/2008 |
| TW | 583886 | 4/2004 |
| TW | I297120 | 5/2008 |
| WO | 2008030967 | 3/2008 |

OTHER PUBLICATIONS

"First Office Action of China Counterpart Application", issued on Jan. 29, 2012, p. 1-p. 8.
"Office Action of Taiwan Counterpart Application", issued on Aug. 8, 2012, p. 1-p. 12.
"Office Action of Europe Counterpart Application", issued on Aug. 15, 2013, p. 1-p. 3.
"Office Action of China Counterpart Application", issued on Dec. 16, 2013, p. 1-p. 16.

\* cited by examiner

*Primary Examiner* — Haoshian Shih
(74) *Attorney, Agent, or Firm* — Jianq Chyun IP Office

(57) ABSTRACT

A method and an apparatus for reminding and browsing related information of contacts, and a recording medium using the same are provided. In the present method, a communication device displays a contact list comprising at least one contact on a screen thereof. Meanwhile, the communication device checks whether each contact has unread related information and displays an indicating icon on the corresponding contact in the contact list when it is determined that the contact has related information unread, so as to remind a user of the communication device that the contact has unread related information.

20 Claims, 8 Drawing Sheets

METHOD AND APPARATUS FOR REMINDING AND BROWSING RELATED INFORMATION OF CONTACTS AND RECORDING MEDIUM USING THE SAME

CROSS-REFERENCE TO RELATED APPLICATION

This application is a continuation application of and claims the priority benefit of U.S. application Ser. No. 12/703,790, filed on Feb. 11, 2010, now pending. The prior application Ser. No. 12/703,790 claims the priority benefit of Taiwan application serial no. 98104649, filed on Feb. 13, 2009. The entirety of each of the above-mentioned patent applications is hereby incorporated by reference herein and made a part of this specification.

BACKGROUND OF THE APPLICATION

To keep up with the bustling pace of modern people's lives, a variety of communication devices which are compact and readily portable has also come forth and replaced old generations at all times. The communication device, e.g. Personal Digital Assistant (PDA) phone, not only can be used for making phone calls, but also has all kinds of diversified functions as a small personal computer, such as writing documents, receiving and sending emails, surfing Internet or using instant messaging software through built-in operating system.

When receiving a short message, an email, and other related information from contacts, a conventional communication device reminds a user by, for example, providing indicating rings or displaying indicating messages. At this time, in addition to saving the information, the communication device also records the information on corresponding browsing interfaces according to the types and receiving orders of the received information for the convenience of the user's viewing. For example, when the user selects the email application, the communication device displays an email list, and show all the received emails based on the time of receiving. Accordingly, by selecting one of the emails, the user can open the email and view the detailed contents of the email.

However, all related information displayed on the browsing interface is classified according to the "type" of the information (e.g. short message, email, or call history) instead of the "contact" to whom the information belongs. If the user only wants to search related information sent by a certain contact, he/she has to look up the information from the lists of different application interfaces corresponding to the information, and has no way to quickly and conveniently view all information related to the contact at one glance, which is very inconvenient.

Additionally, although a conventional communication device can remind a user when receiving new information, if the user does not immediately view the reminder messages and turns them off instead, then the user has to search among the list or menu from the application interface corresponding to the newly received information. As a result, it is difficult for the user to view all the information of a contact and the user has high possibility to miss out the information previously omitted.

SUMMARY OF THE APPLICATION

Accordingly, the present application provides a method for reminding and browsing related information of contacts. When information of a contact is received, an indicating icon is displayed in a contact list so as to remind a user to view the unread related information.

The present application provides an apparatus for reminding and browsing related information of contacts. The apparatus may remind that whether there is unread related information of a certain contact and display detailed contents of the related information.

The present application provides a method for reminding and browsing related information of contacts, which is adapted to a communication device. In the method, when the communication device displays a contact list, it checks whether each of the contacts in the contact list has related information unread. If there is unread related information, then an indicating icon is displayed on the corresponding contact in the contact list so as to remind a user of the communication device that the contact has related information unread.

In an example of the present application, the step of displaying the contact list comprises displaying the contacts having unread related information before the contacts not having unread related information.

In an example of the present application, after the step of displaying the indicating icon on the corresponding contact in the contact list, the method further comprises receiving a selection operation for the contact from the user and displaying read and unread related information of the contact accordingly. When displaying read and unread related information of the contact, the step further comprises arranging the unread related information prior to the read related information and arranging the display order of the read and unread related information based on the time of receiving.

In an example of the present application, after the step of displaying the indicating icon on the corresponding contact in the contact list, the method further comprises receiving a selection operation for the contact from the user and displaying the unread related information of the contact accordingly. When displaying the unread related information, the method further comprises arranging the unread related information based on the time of receiving.

In an example of the present application, after the step of displaying the indicating icon on the corresponding contact in the contact list, the method further comprises receiving a selection operation for the contact from the user and displaying the unread related information of the contact accordingly. The unread related information is classified into a plurality of categories and sorted according to different categories.

In an example of the present application, the step of displaying the unread related information of the contact comprises classifying the related information into a plurality of categories and only displaying the unread related information of one of the categories.

In an example of the present application, the step of displaying the unread related information of the contact further comprises displaying screen buttons corresponding to the categories and upon receiving a selection operation for one of these screen buttons, switching the displayed related information according to the category corresponding to the selected screen button. When displaying the screen button, the method further comprises displaying an indicating icon on the screen button of the corresponding category having unread related information.

In an example of the present application, the method further comprises generating an updated contact list, which comprises at least one contact having unread related information. When generating the updated contact list, the method further comprises classifying the unread related information into a plurality of categories and displaying a plurality of areas corresponding to the categories in the updated contact list, wherein each area displays the contacts having the related information corresponding to the category.

In an example of the present application, the method further comprises displaying a screen button corresponding to the updated contact list and switching the displayed contact list to the updated contact list when receiving a selection operation for the screen button.

In an example of the present application, the indicating icon comprises a number showing the amount of the unread related information.

The present application provides an apparatus for reminding and browsing related information of contacts, comprising a display unit, a communication unit, and an information display module. The communication unit is used for receiving related information of at least one contact and the information display module is used for displaying a contact list which comprises at least one contact on the display unit. The information display module comprises checking whether each contact has unread related information, and displaying an indicating icon on the corresponding contact in the contact list if there is unread related information, so as to remind that the contact has unread related information.

In an example of the present application, the apparatus further comprises an input unit for receiving the user's selection operations. When the input unit receives the selection operation for a certain contact in the contact list from the user, the information display module displays the read and unread related information of the contact, wherein the unread related information is arranged prior to the read related information and is arranged according to a receiving order. In addition, when the input unit receives selection operation for a certain contact in the contact list from the user, the information display module may also display the unread related information of the contact, wherein the unread related information is arranged in an order based on the time of receiving.

In an example of the present application, wherein the unread related information is classified into a plurality of categories and sorted according to different categories.

In an example of the present application, the categories of related information comprise one of the basic information of the contact, a message list, an email list, a social network information list, call history, or a combination thereof. The basic information of the contact comprises one of a name, a mobile phone number, a home telephone number, an office telephone number, an address, a company, pictures/photos, email addresses, a birthday, personal web addresses, blog addresses, accounts of social network services, settings of the contact, and notes, or a combination thereof. The message list comprises all of Short Messaging Service (SMS) messages and Multimedia Messaging Service (MMS) messages of the contact or a combination thereof. The email list comprises the emails sent to or received from all email accounts of the contact. Moreover, the social network information comprises one of the updates of websites, updates of albums, updates of social network services, events of social network services, and a reminder of a birthday, an anniversary, and a meeting or a combination thereof.

In an example of the present application, wherein the comprises one of a list of all contacts, a list of selected contacts, a list of specific group of contacts, and a list of call history, or a combination thereof.

In an example of the present application, the communication device comprises a mobile phone, a smartphone, a PDA phone, a laptop computer, a tablet PC, a car PC, or other mobile communication devices.

The present application provides a recording medium for recording a computer program, wherein the computer program comprises a plurality of program codes, which is adapted to being loaded into a portable electronic device to enable the portable electronic device to execute a method for reminding and browsing related information of contacts. The method comprises following steps. When the communication device displays a contact list, it checks whether each of the at least one contact in the contact list has related information unread. If there is unread related information, then an indicating icon is displayed on the corresponding contact in the contact list so as to remind a user of the communication device that the contact has related information unread.

Base on the above, in the method and apparatus for reminding and browsing related information of contacts and the recording medium using the same of the present application, when related information is received, an indicating icon is displayed on the contact list so as to remind the user to view the related information. When the user selects the contact with the indicating icon, the related information that has been sorted and classified is displayed immediately, allowing the user to quickly browse the related information.

In order to make the aforementioned and other objects, features and advantages of the present application more comprehensible, several examples accompanied with figures are described in detail below.

BRIEF DESCRIPTION OF THE DRAWINGS

The accompanying drawings are included to provide a further understanding of the application, and are incorporated in and constitute a part of the specification. The drawings illustrate examples of the application and, together with the description, serve to explain the principles of the application.

DESCRIPTION

In the present application, a communication device displays a contact list and checks if related information of a contact is received, and if the unread related information is found, an indicating icon is displayed on the corresponding contact in the contact list so as to remind a user that the contact has unread related information. Accordingly, the user may directly browse and view related information of each contact in the contact list. Wherein, the receiving of information of a contact comprises receiving information sent from the contact or receiving information about the contact generated by a function or an application of the communication device.

Figure 1:
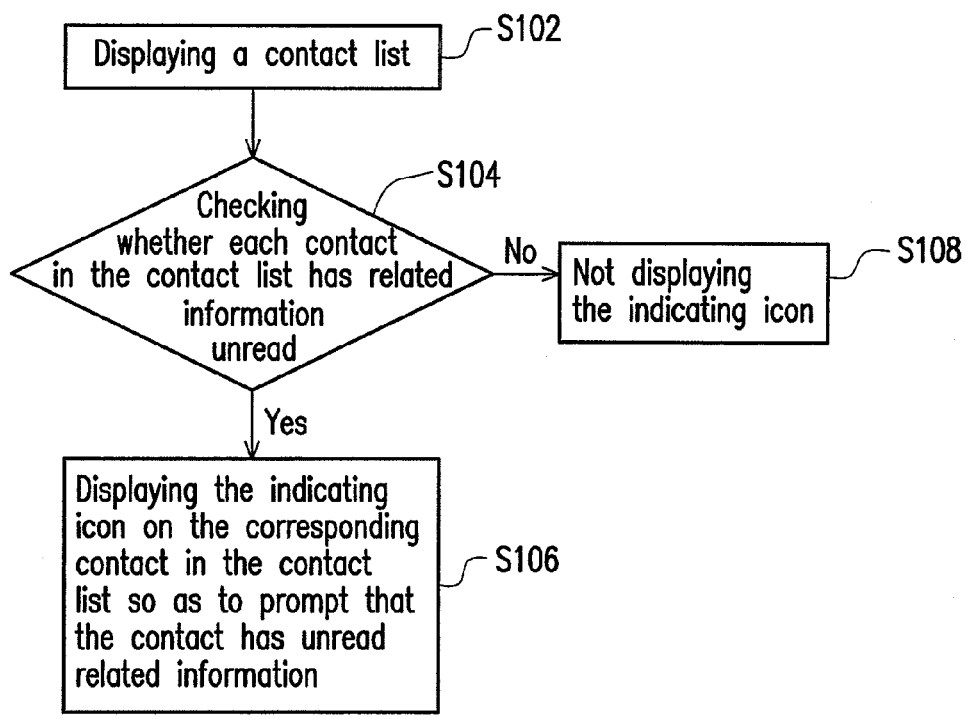
FIG. 1 is a flow diagram illustrating a method for reminding and browsing related information of contacts according to an example of the present application.

FIG. 1 is a flow diagram illustrating a method for reminding and browsing related information of contacts according to an example of the present application. Referring to FIG. 1, the present example is adapted to communication devices such as a mobile phone, a smartphone, a PDA phone, a laptop computer, a tablet PC, a car PC, or other mobile communication devices. Steps of the method are as follows:

First, a communication device displays a contact list on the screen thereof (step S102). The contact list comprises at least one contact for a user to browse. In detail, the contact list of the present example may be, for example, a list of all contacts (e.g. telephone directory of all contacts), a list of selected contacts (e.g. my favorites), a list of specific group of contacts, or a list of call history, etc. The interfaces of the contact lists comprise, for example, names and/or pictures/photos of the contacts accompanied by contact information of the contacts such as telephone numbers or email addresses so as to provide the user with a convenient way to quickly browse general information of the contacts or select certain contact to view detailed information of the selected contact.

When displaying the contact list, the communication device checks whether each contact in the contact list has unread related information (step S104). In detail, when the communication device receives information, the communication device, for example, identifies the identification information (e.g. telephone number, email address, or user name) of the related information and compares the identification information with the identification information of the contacts in the contact lists. If the identification information is matched, the received related information may be associated with the corresponding contact for browsing and viewing later on.

If there is unread related information, an indicating icon is displayed on the corresponding contact in the contact list so as to remind that the contact has unread related information (step S106); on the contrary, if there is no unread related information, the indicating icon is not displayed (step S108). The indicating icon is, for example, a figure, a pattern, or a symbol, and may denote different unread related information with different shapes, different colors, or different symbols. In an example, the indicating icon is, for example, a circle with an exclamation mark in it.

In one example, whenever the communication device receives new related information of a contact, it marks the information as unread related information. Once the communication device opens the contact list, it automatically checks the unread related information of each contact, so as to display the indicating icon on the corresponding contact. Further, during displaying the contact list, the communication device also keeps receiving new related information of the contacts and updating the indicating icons displayed on the contact list so as to remind the user of the newly received information. In one example, even the contact list is not displayed, the communication device may automatically check the unread related information of each contact.

Figure 2:
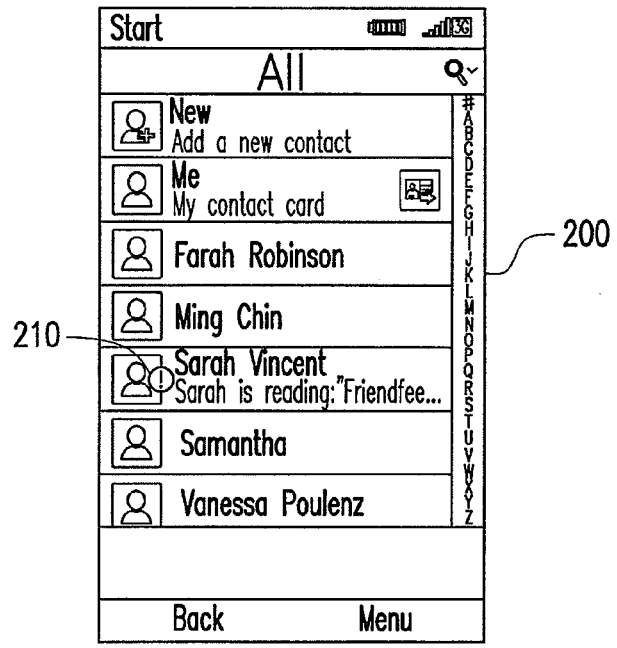
FIG. 2 is an example illustrating a contact list according to an example of the present application.

For instance, FIG. 2 is an example illustrating a contact list of the present application. Referring to FIG. 2, a contact list 200 of the present example displays contacts saved in the communication device, wherein, for example, pictures and names of each contact are displayed. In addition, the present example also comprises displaying an indicating icon 210 of an exclamation mark on the right side of the picture of the contact, Sarah Vincent, which means the communication device receives related information related to the contact Sarah Vincent and the related information has not been read.

Moreover, the communication device may also display the number of unread related information of the contact so as to remind the user of how many related information in total are unread. In detail, the communication device counts the entire number of all kinds of unread related information with respect to each contact and displays the indicating icon with the number on the corresponding contact in the contact list so as to remind the user.

Figure 3:
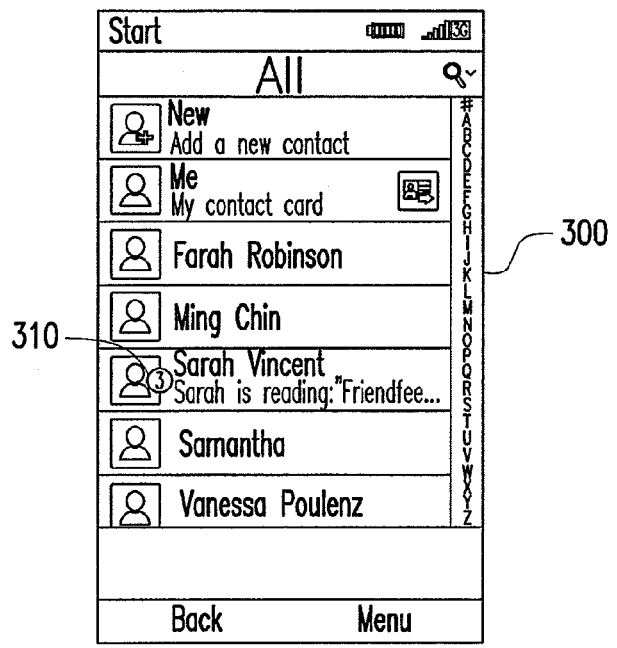
FIG. 3 is an example illustrating a contact list according to an example of the present application.

For instance, FIG. 3 is an example illustrating a contact list according to the present application. Referring to FIG. 3, a contact list 300 of the present example displays contacts saved in the communication device, wherein pictures and names of each contact are included. In addition, the present example also comprises displaying an indicating icon 310 with the number 3 on the right side of the picture of the contact, Sarah Vincent, which means the communication device receives 3 unread updated related information sent form the contact Sarah Vincent or there are 3 unread related information about the contact Sarah Vincent.

It should be mentioned that, in an example, after the communication device determines that a contact has unread related information, the contacts having unread related information are further displayed prior to the contacts not having unread related information in the contact list.

In addition, in another example, the communication device may simultaneously build up an updated contact list. The difference between the updated contact list and the aforementioned contact list lies in that the updated contact list only lists the contacts having unread related information instead of all the contacts. When the updated contact list is being built, for example, the unread related information is classified into a plurality of categories and a plurality of areas corresponding to the categories are displayed in the updated contact list, wherein each area displays the contacts having related information belonging to the category or displays the contacts and introduction of the related information of the belonged category. In addition, the communication device may also display a screen button below the displayed contact list for switching to the updated contact list. When the communication device receives a selection operation for the screen button from the user, it switches the displayed contact list to the updated contact list.

Figure 4A:
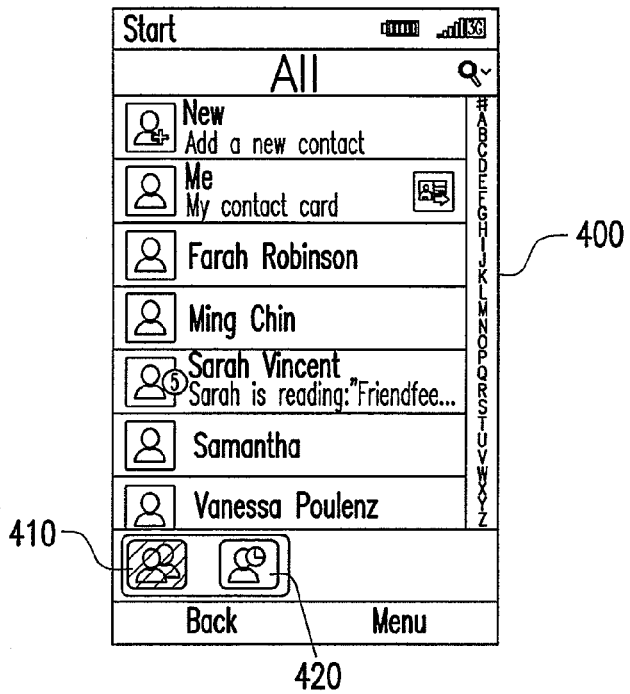
FIG. 4A is an example illustrating a contact list according to an example of the present application.
Figure 4B:
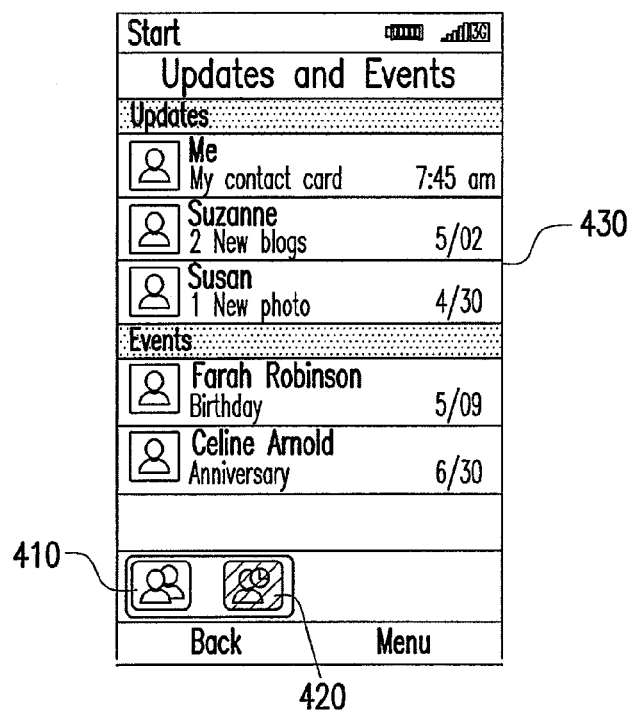
FIG. 4B is an example illustrating an updated contact list according to an example of the present application.

For instance, FIG. 4A is an example illustrating a contact list according to the present application, and FIG. 4B is an example illustrating an updated contact list according to the present application. Referring to FIGS. 4A and 4B, the present example displays screen buttons 410 and 420 below a contact list 400. The screen button 410 is corresponding to the contact list 400 and the screen button 420 is corresponding to an updated contact list 430. When the user presses the screen button 420, the communication device switches the displayed contact list 400 to the updated contact list 430 as shown in FIG. 4B. The updated contact list 430 comprises, for example, an "Updates" area 432 and an "Events" area 432, for listing the contacts having unread related information such as messages of unanswered calls, new messages, new emails, updates of a website, updates of an album, updates of social network services (e.g. Facebook, MySpace, etc.), events of social network services, a reminder of a birthday, a reminder of an anniversary, or a reminder of a meeting, etc. In an example, the communication device may also display screen buttons for a list of selected contacts (e.g. my favorites), a list of specific group of contacts, and a list of call history.

In addition to displaying the indicating icon on the contact list, in an example of the present application, the communication device may also allow the user to view detailed content of the related information by selecting the contact having the indicating icon. Detailed illustration is given in the description of the following example.

Figure 5:
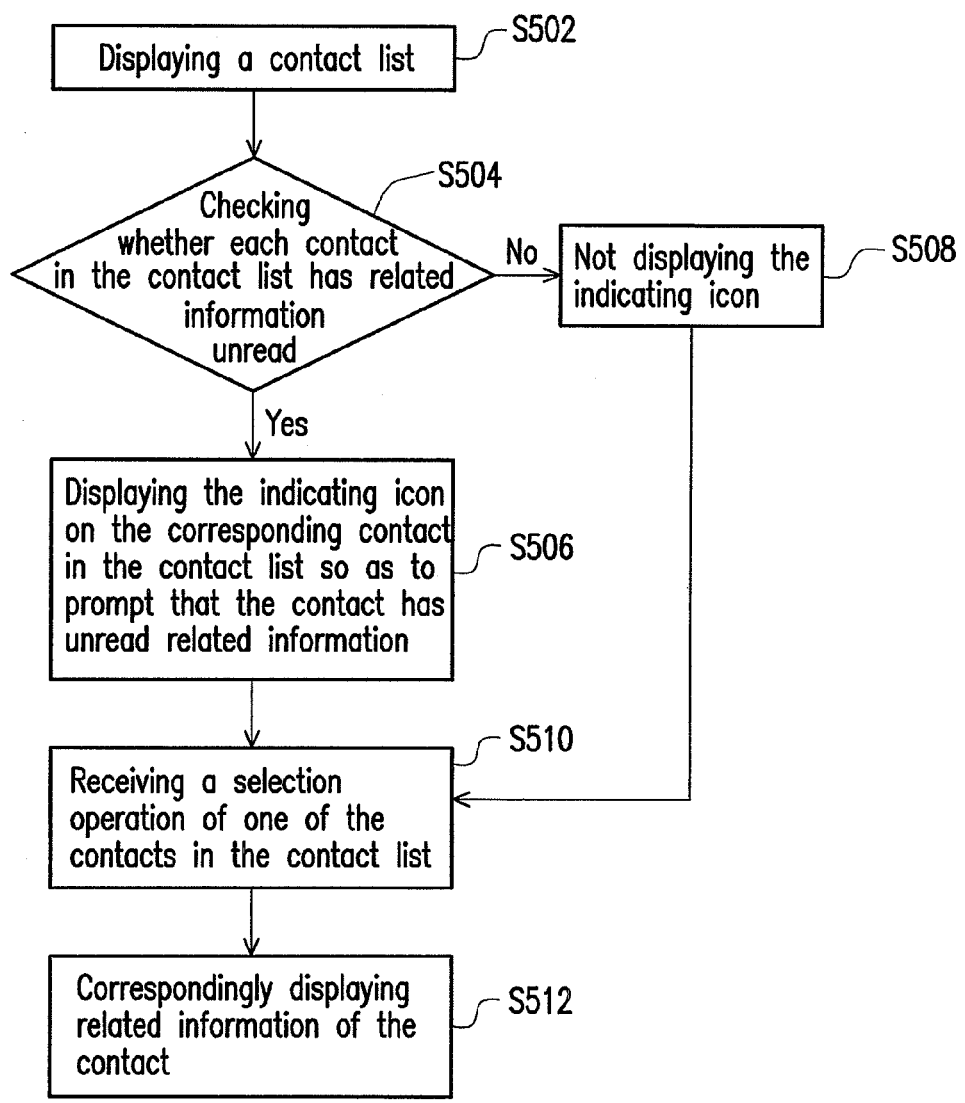
FIG. 5 is a flow diagram illustrating a method for reminding and browsing related information of contacts according to an example of the present application.

FIG. 5 is a flow diagram illustrating a method for reminding and browsing related information of contacts according to an example of the present application. Referring to FIG. 5, the present example is adapted to communication devices. Steps of the method are as follows:

First, a communication device displays a contact list on a screen thereof (step S502). The contact list comprises at least one contact for a user to browse. Next, the communication device checks whether each contact has unread related information (step S504). If there is unread related information, it displays an indicating icon on the corresponding contact in the contact list so as to remind that the contact has unread related information (step S506); on the contrary, if there is no unread related information, it does not display the indicating icon (step S508). Steps S502-S508 are the same as or similar to steps S102-S108 in the previous example, so the detailed contents are not repeated herein.

It should be noted that in the present example, after the contact list is displayed, the communication device keeps receiving the selection operation for a certain contact in the contact list from the user (step S510), and then displays the related information of the selected contact (step S512). After the user selects the contact, the communication device, for example, may display the unread related information of the contact or display all related information of the contact (i.e. read and unread related information included), wherein the unread related information is arranged prior to the read related information. Before displaying the related information, the communication device may also first arrange the related information based on the time of receiving the related information, for example, arranging the last updated related information on top so the user may browse and check the newest related information easily.

Through the method for reminding and browsing related information of contacts, the user of the communication device may check whether each contact has unread related information in the contact list and may also directly select the contact anytime to check the detailed contents of related information. Accordingly, the user may grasp latest related information of the contact anytime without missing any related information.

In an example, after receiving the selection operation for the contact from the user, the communication device may also display the unread related information in categories according to the types of the related information, and provide corresponding screen buttons for the user to switch among the categories. Detailed illustration is given in the description of the following example.

Figure 6:
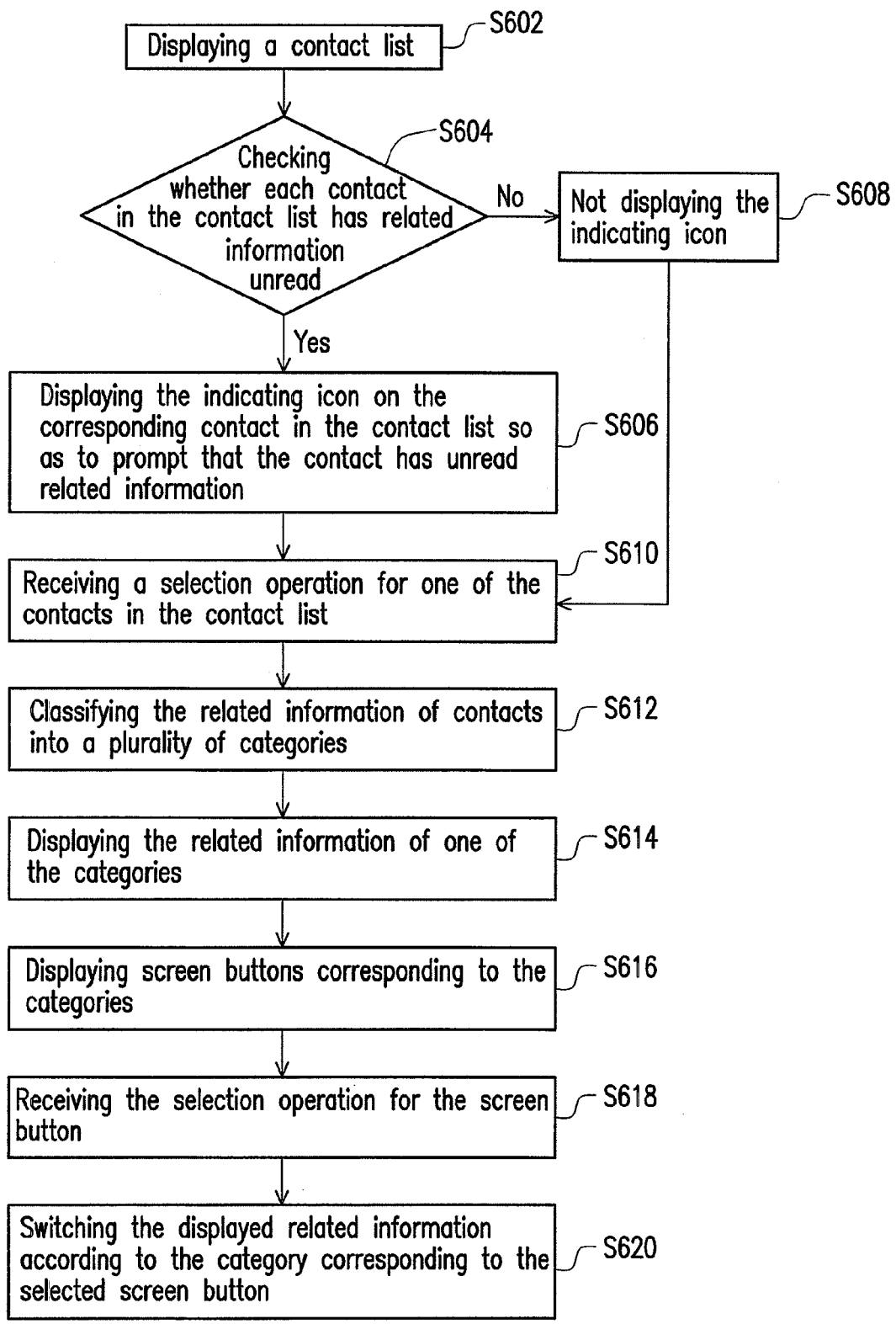
FIG. 6 is a flow diagram illustrating a method for reminding and browsing related information of contacts according to an example of the present application.

FIG. 6 is a flow diagram illustrating a method for reminding and browsing related information of contacts according to an example of the present application. Referring to FIG. 6, the present example is adapted to communication devices. Steps of the method are as following:

First, a communication device displays a contact list on a screen thereof (step S602). The contact list comprises at least one contact for a user to browse. Next, the communication device checks whether each contact has unread related information (step S604). If there is unread related information, it displays an indicating icon on the corresponding contact in the contact list so as to remind that the contact has unread related information (step S606); on the contrary, if there is no unread related information, it does not display the indicating icon (step S608). Steps S602-S608 are the same as or similar to steps S102-S108 in the previous example, so the detailed contents are not repeated herein.

It should be noted that, in the present example, after the contact list is displayed, the selection operation for the contact is received from the user (step S610) and the related information of the contact is displayed. The difference between the previous example and present example lies in that when the communication device displays related information; for example, the communication device classifies the related information into a plurality of categories according to the types of the received related information (step S612) and only displays one type of related information of the categories (step S614). The categories of the related information may comprise information such as basic information of the contact, a message list, an email list, a social network information list, online albums, and call history, etc. In detail, the basic information of the contact comprises a name, a mobile phone number, a home telephone number, an office telephone number, an address, a company, a picture/photo, email addresses, a birthday, personal web addresses, blog addresses, accounts of social network services, settings of the contact, notes, or any combination thereof; the message list comprises Short Messaging Service (SMS) messages or Multimedia Messaging Service (MMS) messages of the contact, or any combination thereof; the email list comprises the emails sent to or received from one or all email accounts of the contact; moreover, the social network information comprises updates of social network services (e.g. Facebook, MySpace, etc.), events of social network services, updates of websites, updates of albums, a reminder of a birthday, an anniversary, or a meeting notice, or any combination thereof.

In addition to displaying related information of a category, the communication device also comprises displaying a screen button of each category (step S616). In one example, the communication device may also display indicating icons on the a screen button if the category corresponding to the screen button has unread related information, so as to remind the user that there is unread related information corresponding to the category. In one example, the indicating icon may also denote the number of the unread related information of the corresponding category.

When receiving the selection operation for a certain screen button from the user (step S618), the communication device switches the displayed related information to the category corresponding to the selected screen button (step S620). Accordingly, the user of the communication device may select and view specific category of related information by selecting the screen button corresponding to the category.

Figure 7:
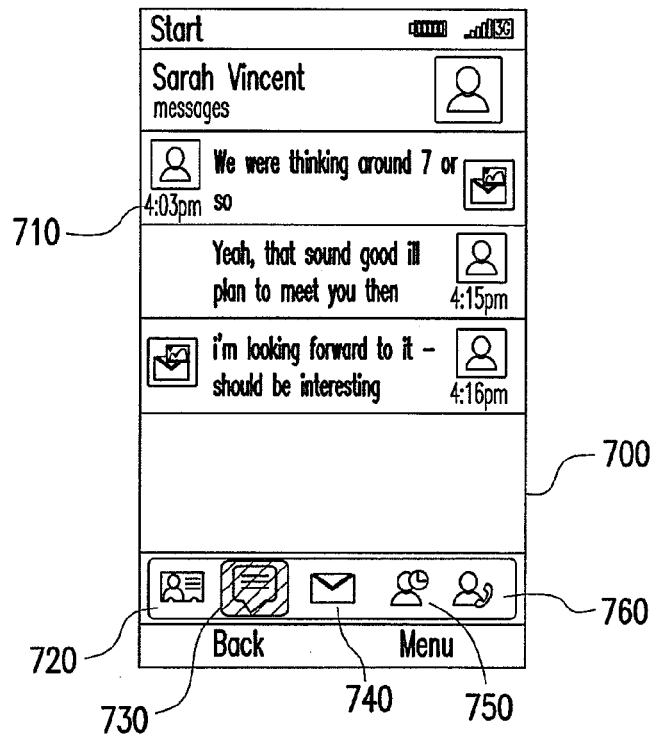
FIG. 7 is an example illustrating a display interface of messages according to an example of the present application.

For instance, FIGS. 7, 8, 9, 10, and 11 are examples illustrating the method for reminding and browsing related information of contacts according to a the present application. Referring to FIGS. 2 and 7 together, after the user of the communication device selects the contact Sarah Vincent in FIG. 2, if the communication device has a short message sent from the contact Sarah Vincent that is unread by the user, then the communication device, for example, displays a user interface 700 and displays a message list 710 in the user interface 700, to list the unread messages received by the communication device from the contact Sarah Vincent. In another example, the communication device may list the unread messages in the upper end of the message list 710, and also display the read messages sent from the contact Sarah Vincent or display the read messages sent from the contact Sarah Vincent and the messages sent to the contact Sarah Vincent.

Additionally, the communication device comprises displaying screen buttons of a basic information button 720, a message button 730, an email button 740, a social network information button 750, and a call history button 760, etc, so as to correspond to display functions of related information of different categories. The basic information button 720 corresponds to the display function of basic information of the contact; the message button 730 corresponds to the display function of messages related to the contact (e.g. messages sent to or received from the contact); the email button 740 corresponds to the display function of emails related to the contact (e.g. emails sent to or received from the contact); the social network information button 750 corresponds to the display function of social network information related to the contact; the call history button 760 corresponds to the display function of the call history between the user and the contact.

It should be noted that, the message button (Messages) in FIG. 7 is, for example, displayed enlarged to represent that the user interface 700 currently displayed by the communication device is the interface for the message list 710. At this time, the user may switch the displayed related information by selecting the basic information button (Details) 720, email button (Email) 740, social network information button (Updates and Events) 750, call history button (Call History) 760, and other screen buttons.

Figure 8:
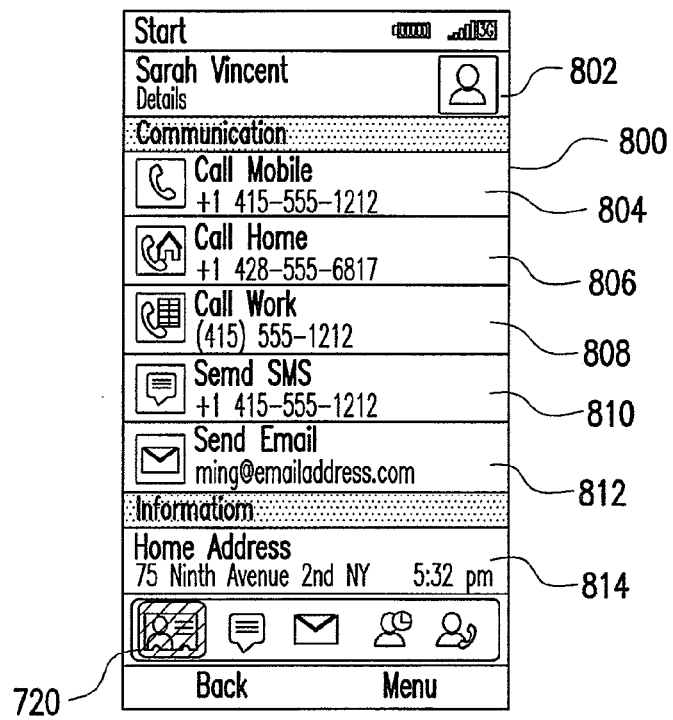
FIG. 8 is an example illustrating a display interface of basic information according to an example of the present application.

In detail, when the user selects the basic information button 720, the communication device displays a user interface 800 as shown in FIG. 8; the user interface 800 comprises displaying a name (Sarah Vincent), a picture 802, a mobile phone number (Call Mobile) 804, a home telephone number (Call Home) 806, an office telephone number (Call Work) 808, a SMS number (Send SMS) 810, and an email address (Send Email) 812. Moreover, the user interface 800 also comprises displaying other basic information such as an address (Home Address) 814, a personal web address (not shown), a blog address (not shown), etc, of the contact.

Figure 9:
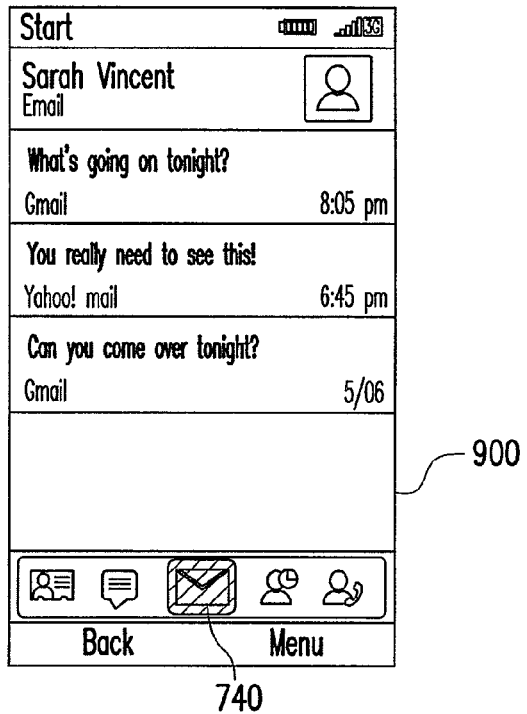
FIG. 9 is an example illustrating a display interface of email according to an example of the present application.

When the user selects the email button 740, the communication device displays a user interface 900 as shown in FIG. 9. The user interface 900 comprises displaying emails such as emails unread by the user, emails sent from email accounts of the contact, emails sent to email accounts of the contact, wherein the email accounts of the emails may also be displayed. The user may save one or more email accounts for one contact.

Figure 10:
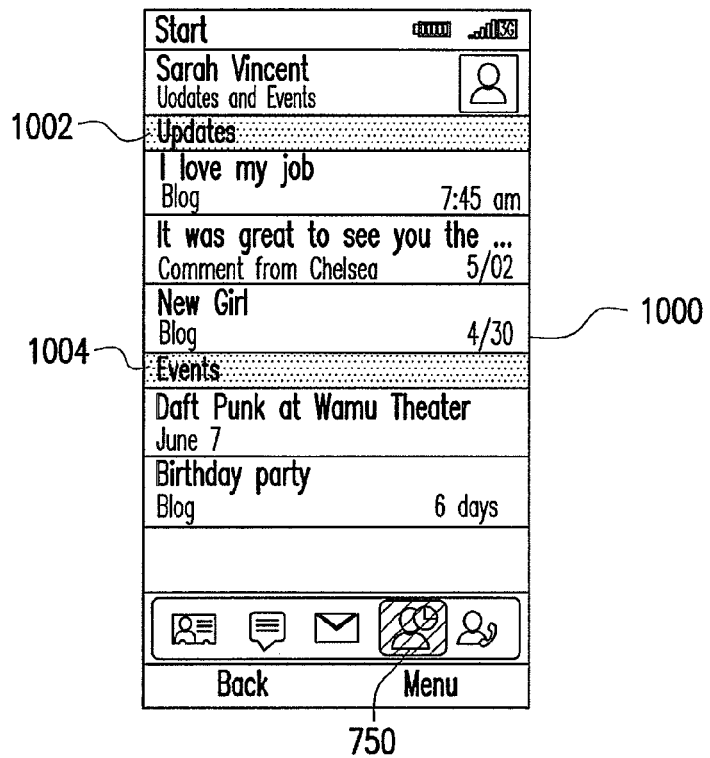
FIG. 10 is an example illustrating a display interface of social network information according to an example of the present application.

When the user selects the social network information button 750, the communication device displays a user interface 1000 as shown in FIG. 10. The user interface 1000 comprises displaying updates 1002 of the contact (Updates, e.g. an update on social network services (e.g. Facebook, MySpace, etc.), an update on a blog) and events 1004 (Events, e.g. an event on social network services, a reminder of a birthday) and so on.

Figure 11:
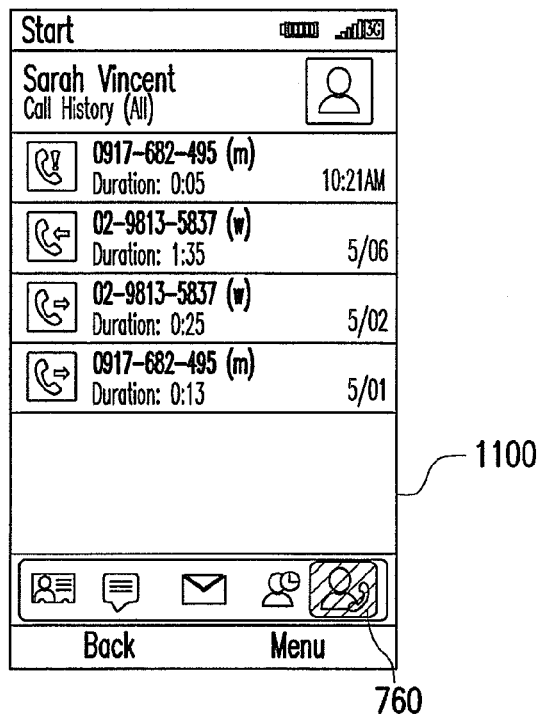
FIG. 11 is an example illustrating a display interface of call history according to an example of the present application.

When the user selects the call history 760, the communication device displays a user interface 1100 as shown in FIG. 11. The user interface 1100 comprises displaying the call history between the user of the communication device and the selected contact, comprising the information such as dialed calls, received calls, and missed calls.

It should be noted that, in the foregoing examples, the communication device firstly displays unread messages of the contact upon receiving the user's selection for the contact. However, in another examples, the communication device may firstly display any of the basic information, unread emails, social network information, and call history of the contact, which is not to be limited herein. For example, if the unread related information is an email, unread emails are firstly displayed; if the unread related information is social network information, the social network information is firstly displayed; if the unread related information is a missed call, a call history is firstly displayed; and if there are more than two categories of unread related information, basic information of the contact is firstly displayed. Alternatively, it may be predetermined to display the basic information of the contact firstly, and the user may then select categories at will. At this time, the user may select the category having unread related information according to the indicating icon displayed on the screen button.

Directed to the method for displaying related information, the present application also provides corresponding hardware devices so that the method is applicable in devices such as a communication device. Detailed description may be explained in the following example.

Figure 12:
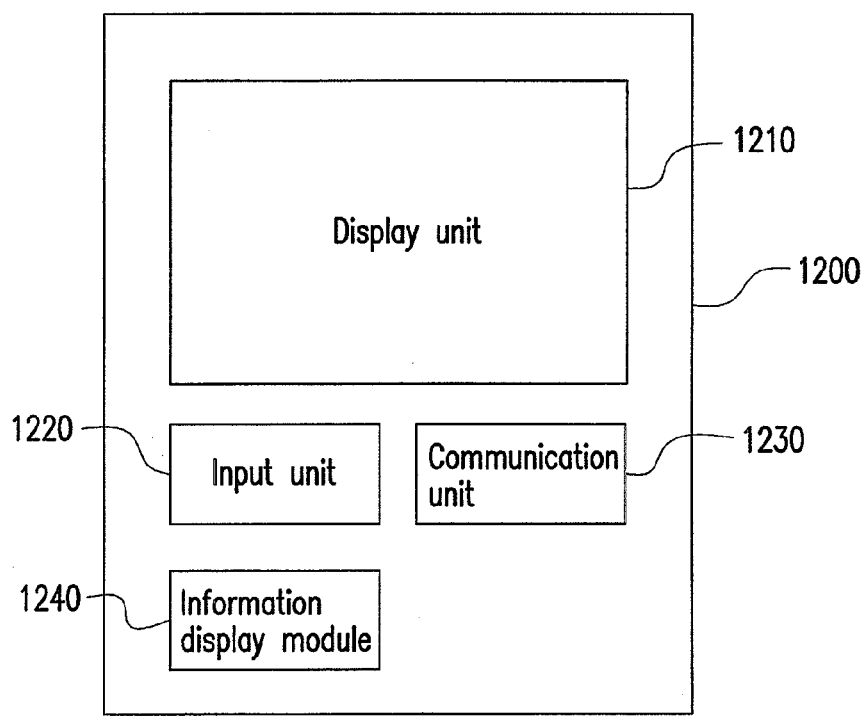
FIG. 12 is a block diagram illustrating an apparatus for reminding and browsing related information of contacts according to an example of the present application.

FIG. 12 is a block diagram illustrating an apparatus for reminding and browsing related information of contacts according to an example of the present application. Referring to FIG. 12, an apparatus 1200 of the present example is, for example, a communication device such as a mobile phone, a smartphone, a PDA phone, a laptop computer, a tablet PC, a car PC, or other mobile communication devices, wherein the apparatus 1200 comprises a display unit 1210, an input unit 1220, a communication unit 1230, and an information display module 1240. The functions are described respectively as follows:

The display unit 1210 is, for example, a Liquid Crystal Display (LCD) for displaying an image of the apparatus 1200. The input unit 1220 is, for example, a button, a keyboard, a mouse, or a touch pad, for receiving the operation of the user performed on the apparatus 1200 to control the apparatus 1200 to execute corresponding functions. It should be noted that the display unit 1210 and input unit 1220 may be combined as a touch screen, for example a resistive touch screen or a capacitive touch screen, so as to receive the touching operation of the user.

The communication unit 1230 is used for communicating with a wireless communication network, for example Global System for Mobile Communication (GSM), General Packet Radio Service (GPRS) system, High-Speed Downlink Packet Access (HSDPA) system, Personal Handy-phone System (PHS), or Wireless fidelity (Wi-Fi) system, or WiMAX system, and receiving related information of telephone calls, messages, and emails and surfing Internet through the wireless communication network.

The information display module 1240 is used for displaying a contact list on the display unit 1210. The contact list comprises at least one contact. In addition, the information display module 1240 also checks whether each contact in the contact list has unread related information. If there is unread related information, an indicating icon is displayed on the corresponding contact in the contact list to remind that the contact has unread related information. The indicating icon is, for example, an exclamation mark or a number which may indicates the amount of the unread related information, but the present example is not limited thereto.

After the information display module 1240 displays the contact list and displays the indicating icon, the apparatus 1200 further comprises receiving a selection operation for a certain contact in the contact list from the user through the input unit 1220. When the input unit 1220 receives the selection operation, the information display module 1240 displays unread related information of the contact or displays all related information of the contact. The related information is, for example, arranged and displayed in the order based on the time of receiving and/or sorted according to the types of the related information.

It should be noted that the information display module 1240 may further classify the related information into a plurality of categories and display related information of one of the categories on the display unit 1210 when the input unit 1220 receives the selection operation for the contact in the contact list from the user. Additionally, the information display module 1240 may also displays screen buttons corresponding to the categories on the display unit 1210 so that the user may switch among the categories by selecting the screen buttons. The categories of the related information and the contents thereof have been described in previous examples so the details are not repeated herein.

It should be noted that the foregoing units and modules may be implemented in a single physical device or distributed over multiple physical devices, and the functionality may be implemented by calls to remote services.

The present application further provides a recording medium for recording a computer program to be loaded into an electronic device for executing the method for reminding and browsing related information of contacts. The computer program is constituted by a plurality of program code segments (e.g. generating organizational diagram program code segment, endorsing sheet program code segment, configuration program code segment, and deployment program code segment), and after the program code segments are loaded in the mobile device and executed, the steps of the method for reminding and browsing related information of contacts are completed, and the functions of the apparatus for reminding and browsing related information of contacts are carried out.

In conclusion, in the method and apparatus for reminding and browsing related information of contacts and the recording medium using the same of the present application, whether each contact has unread related information is checked when a contact list is displayed, and indicating icons are displayed in the contact list so as to remind the user to view related information. In addition, when the user selects the contact with the indicating icon, the related information that has been arranged and classified is displayed immediately, allowing the user to quickly browse the related information.

It will be apparent to those skilled in the art that various modifications and variations can be made to the structure of the present application without departing from the scope or spirit of the application. In view of the foregoing, it is intended that the present application cover modifications and variations of this application provided they fall within the scope of the following claims and their equivalents.

What is claimed is:

1. A method for reminding and browsing related information of contacts, adapted to a mobile communication device with a touch display, the method comprising:
    displaying a contact list comprising contacts from different social network services, wherein names and images of the contacts received from the different social network services are displayed in the contact list;
    receiving an email of a first contacts in the contact list;
    receiving social network service information of the first contact from the different social network services, wherein the received social network service information comprises updates of albums, updates of the social network service, events of the social network service, and a reminder of a birthday;
    receiving a first input to display basic information of the first contact, wherein the basic information comprises the name, the picture, a phone number information, and an email address information of the first contact;
    displaying the basic information of the first contact and category buttons when receiving the first input, and wherein the category buttons comprises a first button for displaying the basic information of the first contact, a second button for displaying received social network information of the first contact; and a third button for displaying the emails of the first contact;
    receiving a second input on the second button;
    displaying a social network service list according to the received social network service information of the first contact, wherein the social network service information list comprises the name and the received social network service information of the first contact, wherein the received social network service information is arranged based on the time of the social network service information in the social network service information list and the last social network service information is arranged at the top of the social network service information list.

2. The method of claim 1, wherein the step of displaying the contact list comprises displaying the contacts having unread related information prior to the contacts not having related information.

3. The method of claim 1, wherein the basic information further comprising one or a combination of a home telephone number, an office telephone number, an address, a company, a picture, a birthday, accounts of social network services, and notes.

4. The method for of claim 2, further comprising:
    arranging the unread related information based on the time of receiving the read and unread related information.

5. The method of claim 1, wherein the contact list is a list of specific group of contacts.

6. The method of claim 1, further comprising:
    displaying an indicating icon on the screen button corresponding to the category having the unread related information, wherein the indicating icon comprises a number showing the amount the unread related information.

7. The method of claim 1, wherein the displayed emails comprise emails sent to or received from all email accounts of the first contact.

8. The method of claim 1, wherein the categories of the related information further comprise a call history of the contact.

9. The method of claim 1, further comprising:
    generating an updated contact list consisting of at least one contact having the unread related information.

10. A storage medium comprising computer readable instructions loaded into an electronic device to execute functions comprising:
    displaying a contact list comprising contacts from different social network services, wherein names and images of the contacts received from the different social network services are displayed in the contact list;
    receiving an email of a first contacts in the contact list;
    receiving social network service information of the first contact from the different social network services, wherein the received social network service information comprises updates of albums, updates of the social network service, events of the social network service, and a reminder of a birthday;

receiving a first input to display basic information of the first contact, wherein the basic information comprises the name, the picture, a phone number information, and an email address information of the first contact;

displaying the basic information of the first contact and category buttons when receiving the first input, and wherein the category buttons comprises a first button for displaying the basic information of the first contact, a second button for displaying received social network information of the first contact; and a third button for displaying the emails of the first contact;

receiving a second input on the second button;

displaying a social network service list according to the received social network service information of the first contact, wherein the social network service information list comprises the name and the received social network service information of the first contact, wherein the received social network service information is arranged based on the time of the social network service information in the social network service information list and the last social network service information is arranged at the top of the social network service information list.

11. An apparatus for reminding and browsing related information of contacts, comprising:

a display unit;

a communication unit, for receiving related information of a plurality of contacts comprising an email of a first contact in a contact list;

an input unit for receiving a first input and a second input; and an information display module coupled to the display unit and is for displaying the contact list comprising contacts from different social network services, wherein names and images of the contacts received from the different social network services are displayed in the contact list receiving social network service information of the first contact from the different social network services, wherein the received social network service information comprises updates of albums, updates of the social network service, events of the social network service, and a reminder of a birthday;

receiving the first input to display basic information of the first contact, wherein the basic information comprises the name, the picture, a phone number information, and an email address information of the first contact;

displaying the basic information of the first contact and category buttons when receiving the first input, and wherein the category buttons comprises a first button for displaying the basic information of the first contact, a second button for displaying received social network information of the first contact; and a third button for displaying the emails of the first contact;

receiving the second input on the second button;

displaying a social network service list according to the received social network service information of the first contact, wherein the social network service information list comprises the name and the received social network service information of the first contact, wherein the received social network service information is arranged based on the time of the social network service information in the social network service information list and the last social network service information is arranged at the top of the social network service information list.

12. The apparatus of claim 11 wherein the information display module is further configured for displaying the contacts having unread related information prior to the contacts not having unread related information.

13. The apparatus of claim 11, wherein the basic information further comprises one or a combination of a home telephone number, an office telephone number, an address, a company, a picture, a birthday, accounts of social network services, and notes.

14. The apparatus of claim 11, wherein the contact list is a list of specific group of contacts.

15. The apparatus of claim 11, wherein the information display module is further configured for displaying an indicating icon on the screen button of the corresponding category having the unread related information.

16. The apparatus of claim 15, wherein the indicating icon comprises a number showing the amount the unread related information.

17. The apparatus of claim 11, wherein the displayed emails comprise emails sent to or received from all email accounts of the first contact.

18. The apparatus of claim 11, wherein the categories of the related information further comprise a call history of the contact.

19. The apparatus of claim 11, wherein the information display module is further configured for displaying an updated contact list consisting of at least one contact having the unread related information.

20. The apparatus of claim 11, wherein the displayed social network information comprises one or a combination of updates of albums, updates of social network services, events of social network services, and a reminder of a birthday.

* * * * *